United States Patent [19]

Tanaka et al.

[11] 4,323,455
[45] Apr. 6, 1982

[54] COMPACT TYPE FLUID TREATMENT APPARATUS

[75] Inventors: Yoshinobu Tanaka; Koichi Ogawa; Minoru Hioka, all of Kurashiki, Japan

[73] Assignee: Kuraray Co., Ltd., Kurashiki, Japan

[21] Appl. No.: 179,486

[22] Filed: Aug. 19, 1980

Related U.S. Application Data

[63] Continuation of Ser. No. 21,765, Mar. 19, 1979, abandoned.

[30] Foreign Application Priority Data

Mar. 28, 1978 [JP] Japan .................................. 53-36285
Nov. 15, 1978 [JP] Japan ................................ 53-141407

[51] Int. Cl.$^3$ ........................ B01D 13/00; C02F 1/44
[52] U.S. Cl. ............................... 210/321.2; 210/456
[58] Field of Search ............................ 210/645–647, 210/321.2, 456, 493.3, 541

[56] References Cited

U.S. PATENT DOCUMENTS

| | | | |
|---|---|---|---|
| 3,907,687 | 9/1975 | Hoeltzenbein | 210/321.2 |
| 3,912,637 | 10/1975 | Esmond | 210/321.2 |
| 3,960,730 | 6/1976 | Miller | 210/321.2 X |
| 4,038,192 | 7/1977 | Serur | 210/321.2 |
| 4,110,220 | 8/1978 | Lavender | 210/321.2 X |
| 4,116,841 | 9/1978 | Borsanyi | 210/321.2 |

Primary Examiner—S. Leon Bashore
Assistant Examiner—Ferris H. Lander
Attorney, Agent, or Firm—Oblon, Fisher, Spivak, McClelland & Maier

[57] ABSTRACT

The apparatus according to this invention is provided with a stack assembly composed of two kinds of cells disposed in such order of arrangement that the adjacent cells are different in kind from each other. A first cell includes a first fluid distribution means and a membrane lying on either side of said means. A second cell includes a second fluid distribution member that forms independent tunnel-like fluid paths between the membrane support sheet and respective ones of the paired members having a plurality of grooves on one surface thereof, said membrane support sheet being provided with a large number of projections on the central portion thereof and said pair of grooved members being arranged so that the grooved surfaces are face-to-face with each other, interposing said membrane support sheet therebetween. In order that each of said distribution members may introduce a respective fluid separately through said stack assembly and said first fluid may be distributed between a pair of membranes composing the first cell as well as the second fluid distributed between the second cell and adjacent membrane, the fluid manifolds of all of said cells communicate with the inlet and outlet ports for the first and second fluids and are arranged so as to perform substantially uniform diffusion exchange of substances between said first and second fluids.

18 Claims, 12 Drawing Figures

COMPACT TYPE FLUID TREATMENT APPARATUS

This is a continuation of application Ser. No. 021,765, filed Mar. 19, 1979, now abandoned.

BACKGROUND OF THE INVENTION

This invention relates to an apparatus for separating substances through a membrane. The term "separation" applied herein means a process of dialysis by which the substances contained in the first fluid are transferred to the second fluid through said membrane, a process of permeation of the first fluid itself into the second fluid in which the transfer of substances in the first fluid through the membranes is suppressed, or a process of filtration of substances present in the first fluid through the membrane.

Thus, in particular, this invention relates to an apparatus applicable to a wide variety of processes requiring a high ratio of the effectively working surface area of the membrane against the volume of the apparatus, such as an artificial lung for exchanging carbonic acid gas for oxygen through the membrane, an inverse permeation apparatus for purification and desalting of water, an artificial kidney for blood purification, or an ascitic treatment apparatus for condensing ascites collected in the abdominal cavity.

Still further, this invention concerns an apparatus for removing impurities and excessive water content from the blood by extracorporeal hemodialysis or hemo-filtration, having a very large effective membrane surface area within a small unit, requiring only a small priming quantity of blood, and being portable during the use thereof.

In the field of artificial kidneys, a trial application of the principle of dialysis or ultra-filtration is under way for purification of blood by hemodialysis or hemo-filtration. An artificial kidney to which the principle of dialysis is applied has already been in practical use. Purification of blood by dialysis results from a concentration gradient arising across the semipermeable membrane. That is, impurities present in the blood permeate from blood into dialysate through the membrane at higher speed than that of permeation in the inverse direction and, as a result, an effective transfer of impurities is achieved.

The microscopic holes of the semipermeable membrane used for hemodialysis are large enough to allow relatively small molecules of impurity to pass therethrough but not blood cells and protein which are large in molecular size. Sugar and various kinds of salt which are an indespensable constituent for blood are so small in size that they can pass through these holes, however, they are prevented from being removed from the blood if contained in the dialysis, too, at an equal degree of concentration to that in the blood. Excessive water content is also removed from the blood by ultrafiltration. In this case, water content is driven out from the blood through the holes of semipermeable membrane by generating a pressure gradient across the membrane, rendering the pressure on the side of blood slightly higher than that on the side of dialysate.

An artificial kidney to which the principle of ultrafiltration is applied is in review at the present time. Purification of blood by means of filtration is discussed in connection with four major methods as follows:

(1) A method to remove impurities in the blood and the filtered blood plasma including low-molecular-weight substances through the membrane and return blood corpuscle components and condensed blood including high-molecular-weight substances to the human body;

(2) A method to separate blood into a group of blood corpuscle components and condensed blood including high-molecular-weight substances and the other group of impurities and filtered blood plasma including low-molecular-weight substances, and return the filtered blood plasma in the form of a mixture with condensed blood to the human body after removing toxicity, adjusting electrolyte, and removing excessive water content;

(3) A method to dilute blood with substitution fluid, filter the diluted blood in quantity equal to the increment due to dilution through the membrane, remove filtered blood plasma including impurities and low-molecular-weight substances, and return the remaining blood to the human body;

(4) A method to filter the blood in two steps using two kinds of membranes differing from each other in diameter of the hole, pass the corpuscles filtered through the membrane in the first step through active carbon adsorbent, filter the low-molecular-weight substance having a value on the order of several hundreds through the membrane in the second step, and, after removing toxicity, adjusting electrolyte, and removing excessive water content, return the filtered corpuscles in the form of a mixture with condensed substitution fluid to the human body.

However, the dialysis type artificial kidney or the filtration type one hitherto used have drawbacks such as requiring a large quantity of blood due to the priming volume thereof still remaining considerably large, incurring some quantity of blood loss for the same reason as above, requiring an external blood pump for coping with resistance of the fluid path, and necessitating the skilled technical personnel for operation control over the artificial kidney and an attendance of a physician.

Accordingly, efforts for developing an artificial kidney are being directed in these days toward miniaturization of the apparatus without functional decline for minimizing the priming volume and elimination of the need for an external blood pump.

As a new development in this field, in U.S. Pat. Nos. 3,522,885 and 3,565,258, there is disclosed a small-sized hemodialyzer in which a large number of parallelly disposed membrane tubes made of regenerated cellulose, both ends of all tubes being connected with each other with epoxy resin so as to provide a common opening communicating with every tube, are contained in the plastic case and the membrane support members are arranged between or within said parallelly disposed tubes in large number as said above. Also, in U.S. Pat. No. 3,788,482, a small-sized hemodialyzer is disclosed wherein membrane support members are inserted into pleats on one side of a sheet-like membrane made of regenerated cellulose and folded in the form of closely spaced pleats, each end of said membrane being sealingly embedded into the plastic material constituting a part of the case.

These hemodialyzers are considerably smaller in size because of the use of thin nonwoven meshes as membrane support members, requiring no external blood pump and being disposable after use.

However, a hemodialyzer using nonwoven meshes as membrane support members has various functional disadvantages as follows:

(1) There is a tendency to make bubbles stay at the meshes of the membrane support member. As will be described later the, staying of bubbles is a large factor in causing functional decline of dialysis;

(2) When the membrane support member is made thinner for miniaturization of the apparatus, filaments composing the nonwoven mesh are obliged to be made fine and deform in the direction from the blood side to the dialysate side due to the blood pressure. As a result, a deviation in the flow of blood and dialysate, an increase in resistance of fluid path, and, in addition, deviation in the supply quantity of blood are caused.

The hemodialyzer using nonwoven meshes as membrane support members can be made small in size as mentioned above and can reduce priming volume but, as a result, is obliged to sacrifice dialytic function. Therefore, it is preferrable to avoid the use of nonwoven mesh as a membrane support member for providing a hemodialyzer small in size with high performance.

On the other hand, U.S. Pat. Nos. 3,841,491 and 3,837,496 disclose a hemodialyzer using a membrane support plate minutely molded as the membrane support member. The structure of this apparatus includes a large number of support plates elaborately designed, mutually connected, and arranged so that the flat surfaces thereof are put into contact relation with each other through a pair of interposed membranes which form a fluid path therebetween. The assembly composed of support plates and membranes is provided with a dialysate manifold hole extending throughout the assembly and fitted with dialysate distributing discs for forcing the support plate towards the adjacent membrane, as well as a blood manifold hole extending throughout the assembly and fitted with blood distributing discs for forcing the support plate to the adjacent membrane.

In such a hemodialyzer, minutely molded membrane supporting plastic plates are used. Since elaborate fluid paths for dialysate and blood are provided on either surface of this support plate, these fluids can flow smoothly through respective paths. As compared with the hemodialyzer using said non-woven meshes, this apparatus is excellent in performance. Hence, for promoting dialytic function, the use of a molded support plate is recommended. As a method to mold such an elaborately designed support plate on a mass-scale, injection molding has been employed. However, it is technically difficult to mold such an elaborately designed support plate as thin as 1.2 mm or less by injection molding, and particularly more difficult in the case of a thickness of 0.5 mm or less. Because of such circumstances, the support plate molded by injection molding and used for the hemodialyzers generally sold on the market is so thick, ranging from 2 to 5 mm, that these hemodialyzers containing many pairs of membranes in stack are bulky, and posses such drawbacks as large priming volume and difficulty in handling in the hospital.

An idea to minimize the size of a hemodialyzer by molding an elaborately designed thin support plate with the application of a method other than injection molding may easily occur. However, it has been found that there arise many problems which are unforeseen from the hemodialyzers using conventional support plates and which bring about functional decline when only the thickness of support plate in a conventional structure is reduced without any other modification. The most important problem, among others, is that the thinner the support plate is made, the more the bubbles stay in the dialysate path.

The reason why the number of staying bubbles increases with the reduction of thickness of the membrane support plate is comprehended as follows:

The bubbles are subjected to the surface tension of ambient fluid acting to maintain the globular shape of the bubbles and resist deformation. It will be obvious that such resistance becomes larger in proportion to decrease in the size of bubble and increase in the degree of deformation. Accordingly, when the membrane support plate is made thinner, that is, the cross section area of fluid path is smaller, finer bubbles are generated and resist deformation more. In the conventional membrane support plate, for example, the section area of fluid path is small at the juncture where the slit-like opening for a dialysate distributing header is connected with the fluid path of dialysate formed between the support plate and the adjacent membrane. Bubbles contained in the dialysate can not easily be discharged from the slit-like opening to the fluid path of the dialysate along the fluid flow unless divided into two parts in the direction of thickness or deformed to such an extent as to be halved or less. In a comparatively thick support plate of conventional type, the number of staying bubbles is small since small bubbles pass through said juncture and large ones incapable of passing therethrough by remaining unchanged in size are easily deformed by fluid flow owing to less resistance to deformation, thereby, passing therethrough. In contrast with this, when a support plate is made thinner, small and undeformable bubbles generate and show a high degree of resistance to the connecting portion abruptly changed in configuration, becoming incapable of passing through said portion and staying at the slit-like opening. The nonwoven mesh sheet has an abrupt change in section area at the connecting portion of individual meshes where the rate of change in area from the connecting portion to the mesh portion numbers one half or less and, therefore, bubbles stay inevitably. In the molded support members, too, there is a fear that bubbles stay at not only the slit-like opening but the membrane support portion in the central zone of the support plate on account of swelling of the membrane during use. Swelling of the membrane must be taken into full consideration with respect to the projections and arrangement thereof for forming the membrane support zone.

The reasons for preventing bubbles from staying in the artificial kidney is as follows:

(1) Fluid does not flow where bubbles are present in the fluid path, as contact of fluid with the membrane is interrupted and as a result the effective area of the membrane is reduced;

(2) Clogging of bubble in the fluid path increases the resistance of the fluid path;

(3) Flow of fluid deviates as the fluid does not flow where bubbles are present; and, (4) There is a risk that the fluid forming bubbles diffuse into the blood through the membrane, which leads to blood coagulation due to contact of blood with air.

When thus viewed, it is important to develop a construction of the membrane support plate in which no bubbles stay, that is, no abrupt change in section area is produced in the fluid path, for providing a small-sized hemodialyzer of high performance of dialysis using thin plates as membrane support members. Similarly, it is also important to reduce blood priming volume by miniaturizing the hemodialyzer and, on the other hand, to raise the efficiency thereof by enlarging the interfacial area of the membrane between the blood and the dialysate.

Another object of the development of the artificial kidney is to provide an apparatus portable during use and continuously operable, requiring only periodic replacement. The patient may have no other need than a single replacement per week or month of such an artificial kidney as above which is operable while attached to the body of the patient who leads daily normal life, and he may be released from the inconvenience of having to undergo blood purifying treatment at fixed intervals. Further, a continuously operable artificial kidney will help prevent accumulation of toxic materials in blood, thanks to which the patient will gradually recover his health.

An artificial kidney of such a kind which is portable and continuously operable can be developed on the basis of research into the following three points:

(1) Establishment of a method for completely preventing blood coagulation in the apparatus;

(2) Finding a method for cleansing dialysate so as to minimize a required quantity of dialysate for operation, or a method for treating the discharge filtration liquid when using the filtration type artificial kidney; and, (3) Development of an apparatus provided with a working surface of the largest possible area in the smallest possible volume for obtaining effective dialysis as well as for enabling the patient to conveniently carry the apparatus during his daily activities.

The first two of the above problems are now on the way of solution, and the last one for providing a sufficient area in the smallest volume is considered soluble by utilizing the embodiment of this invention. Thus, this invention is applicable to an artificial kidney that is portable and continuously operable.

SUMMARY OF THE INVENTION

An object of this invention is to provide a fluid treatment apparatus using thin membrane supporting members in which the change of section area of the fluid path is not abrupt and having membranes that possess a very large surface area in a unit whose internal volume is comparatively small, and, in particular, to provide an apparatus as described above which can be used as an artificial kidney for purifying blood of those who are suffering from chronic renal disease or nepropathy and also can be primed with a very small quantity of blood on account of high performance in contrast with the small size of the unit. Another object is to provide an artificial kidney having membranes which possess a large surface area in the smallest possible volume, and, thus, are applicable as a portable artificial kidney that is operable continuously.

A further object of this invention is to provide an artificial kidney that can be manipulated by the patient at home without requiring skilled technical personnel or a physician, and, in addition, can provide an artificial kidney simple in structure which may be thrown away after being used.

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

DETAILED DESCRIPTION OF THE PREFERRED EMBODIMENTS

An artificial kidney according to this invention is of such construction as to have a very large active surface area of membrane, requiring only a small priming quantity of blood, and causing no staying of bubbles at the fluid path, the large active surface area of the membrane being made possible by the use of a thin membrane support sheet forming the membrane support zone. In this apparatus a second fluid cell composed of a pair of members provided with grooves for forming the second fluid path, disposed on either side of the membrane support sheet, and tightly pressed with each other so that the grooved surfaces thereof are put in face-to-face relation is used, as well as a first fluid cell composed of a pair of membranes and first fluid distribution members for introducing the first fluid into the space between said pair of membranes. This pair of membranes forms a chamber for the first fluid between themselves and another chamber for the second fluid between each of the membranes and the respective adjacent membrane support sheet.

A thin membrane support sheet, when using the thermoplastic sheet as a material, can be manufactured by the application of embossing molding or press molding so as to be provided with projections for forming the membrane support zone, and, when using the thin metallic sheet, can be done by etching work.

It will be understood that this invention, although it will be described hereunder as a hemodialyzer with reference to one preferred embodiment thereof, is not limited to this specific embodiment and is applicable to any modification and analogue included within the spirit and scope of the disclosure.

According to this invention, dialysate cells provided with the membrane support sheet and blood flow cells provided with a pair of membranes are arranged in the form of a unit of stack members so that a blood flow cell lies between paired dialysate cells.

Although comprehensive understanding of the description of this invention is necessary, more important for clarifying the manipulation and construction of the apparatus according to this invention is understanding of a construction of the fluid path interconnecting the dialysate manifold and the dialysate chamber, so that said construction will be referred to firstly.

As is apparent from the foregoing description, the thinner the membrane support plate is made, the more the bubbles stay easily, thereby causing decline of dialysis function. Hence, it is important, when using a thin membrane support plate, to employ such structure as is free of abrupt change in section area thereof. However, to mold integrally the path for connecting the manifold hole with the membrane support zone and said zone itself in elaborately designed thin plate is very difficult. In view of this, in this invention is employed a structure where the dialysate chamber formed between the sheet provided with the membrane support zone and adjacent membrane is connected with the dialysate manifold by a tunnel-like channel defined by paired dialysate distributing members having grooves and arranged so that the grooved surfaces thereof are face-to-face and interpose the membrane support sheet. Staying of bubbles in the dialysate chamber, particularly that due to swelling of the membrane during the use of the apparatus, is prevented by formation of a great number of projections in the membrane support zone. In this structure, at the dialysate introducing portion, the dialysate manifold communicates with two dialysate chambers formed on either side of said membrane support sheet through the tunnel-like channels independent from each other. In the membrane support zone, a large number of projections are provided in the central portion of the membrane support sheet and, so, no abrupt change in the section area of the fluid path is produced. In this way, this invention makes it possible to provide a dialyzer of high performance and capable of preventing staying of bubbles in contrast with small size thereof.

Figure 1:
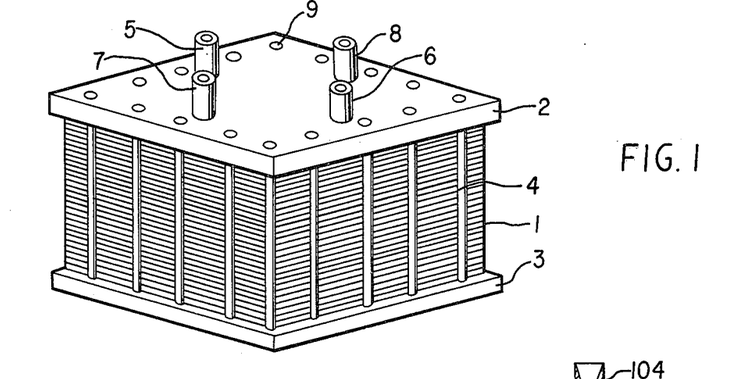
FIG. 1 is a perspective view of a hemodialyzer assembly according to this invention.

Referring to FIG. 1, the hemodialyzer 1 embodying the principle of this invention comprises a plurality of blood flow cells, dialysate cells, and two sheets of manifold pressing plates 2 and 3. The manifold pressing plates 2 and 3, each being disposed at one end of the stack assembly composed of blood flow cells and dialysate cells, are identical with each other in configuration but different in purpose of use.

The manifold pressing plate 2 includes the dialysate inlet port 5, outlet port 6, blood inlet port 7, and outlet port 8, which are provided to introduce and discharge, the dialysate and the blood, respectively. The pressing plates 2 and 3 are flat, however, when made of thin plate, they are required to be reinforced with ribs in the form of a grate on the outside surface thereof. An assembly of the stacked members and the pressing plates are compressed by a press exercising a suitable magnitude of pressure. All members in the stack assembly are kept aligned with each other by pins 4. These sixteen pins extend through sixteen holes drilled on the peripheral portion of each cell. These holes are provided in the pressing plates 2 and 3 and preferably in each cell for aligning stacked members. The dialyzer 1 comprises a series of cells arranged in the order of, dialysate cell, blood flow cell, dialysate cell, blood flow cell, .... The blood flow cell must always be disposed between two dialysate cells.

Figure 2:
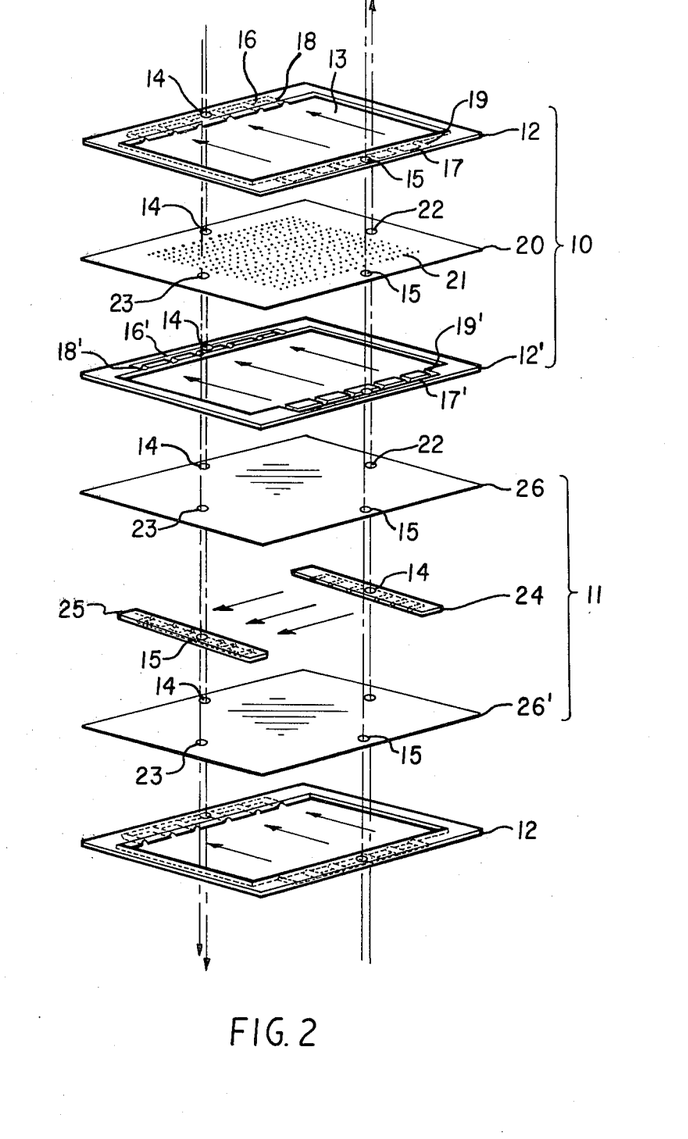
FIG. 2 is an exploded view showing a fundamental arrangement of composing members in a stack assembly by way of illustration of blood flow cells and dialysate cells.

FIG. 2 shows the order of stacking each member to be stacked in the assembly by way of an exploded view of dialysate cell 10 and blood flow cell 11. The dialysate cell 10 is composed of a pair of frames 12, 12', each being provided with a wide opening 13 at the central portion thereof, manifold holes 14, 15 communicating with the dialysate inlet and outlet ports at the peripheral portion thereof, dialysate distributing grooves 16, 16' and 17, 17' communicating with said manifold holes, and a plurality of grooves 18, 18' and 19, 19' for connecting said grooves 16, 16' and 17, 17' with said wide opening 13; and the membrane support sheet 20 is provided with a large number of projections 21 at the central portion thereof and manifold holes 22, 23 communicating with the blood inlet and outlet ports at the peripheral portion thereof. Said dialysate frames 12, 12' are arranged face-to-face, interposing the membrane support sheet therebetween. Therefore, when the stack assembly is compressed, the grooves of each of said frames 12, 12' form tunnel-like channels independent from each other with the membrane support sheet 20 between them. Since the independent fluid paths communicating the manifold holes with the wide opening 13 have no part where the section area abruptly changes, bubbles in the dialysate pass through the fluid path without staying.

On the other hand, the blood flow cell 11 is composed of a pair of membranes 26, 26' provided with manifold holes 22, 23 14 and 15, the former two communicating with the blood inlet and outlet ports while the latter two with the dialysate ones, at the periphery portion thereof, a blood distributing member 24 disposed between paired membranes and having the manifold hole 14 or 15 communicating with the blood inlet or outlet port and the fluid path for guiding the blood into the blood chamber formed by paired membranes and communicating with the manifold holes; and another blood distributing member 25 having a fluid path for introducing the blood outward from the blood chamber. The abovesaid distributing members 24 and 25 are identical with each other in shape and fitted in the wide opening 13 of the frames 12, 12' for the dialysate. Therefore, when the stack assembly is compressed, the blood distributing members are fluid-tightly stacked and can prevent blood leakage and dialysate leakage into blood.

Figure 3:
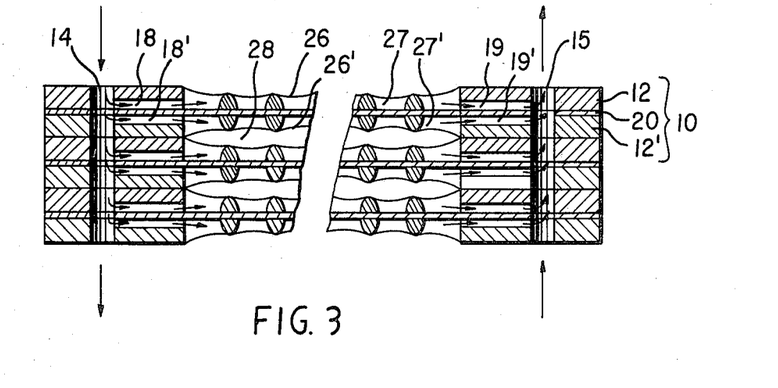
FIG. 3 is a detailed view for clearly showing the dialysate path.
Figure 4:
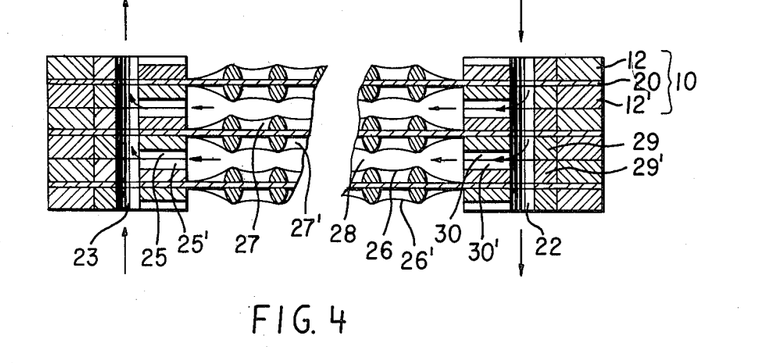
FIG. 4 being the same for the blood path, shown in FIG. 2.

For further clarity of fluid paths for blood and dialysate, FIGS. 3 and 4 are referred to as follows:

FIG. 3 is a sectional view of the dialysate path. The dialysate cell 10 is composed of a membrane support sheet 20 extending between a pair of the dialysate frames and interposed by said frames. The dialysate cell 10 composed of a pair of dialysate frames 12, 12' and the membrane support sheet 20 extending between said pair of frames and the blood flow cell having a pair of membranes 26, 26' are placed in stack together. Dialysate is introduced from the dialysate manifold hole 14 of each cell into two tunnel-like channels separately formed by the grooves 18, 18' formed on the dialysate frames 12, 12' and the membrane support sheet 20, and then into the dialysate chambers 27, 27' formed between the membrane 26 and the membrane support sheet 20 as well as between another adjacent membrane 26' and said sheet 20.

The dialysate, after exchanging substance with the blood introduced into the blood chamber 28 formed between paired membranes, is introduced to the dialysate manifold hole 15 through the tunnel-like channel formed by the grooves 19, 19' on the dialysate frames 12, 12' and the membrane support sheet 20.

FIG. 4 is a sectional view of the blood path, wherein the distributing members 24 and 25 for introducing and discharging the blood comprise the tunnel-like fluid path formed by a pair of members 29, 29' provided with the grooves 30, 30' similar in construction to those of the dialysate frames 12, 12' and arranged so that the grooved surfaces thereof are face-to-face. The blood flow cell composed of a pair of membranes 26, 26' and of the blood distributing members 24, 25 arranged between the membranes are disposed within the wide opening 13 of the dialysate frames 12, 12' composing the dialysate cell 10 with the membrane support sheet 20 interposed therebetween. Blood is introduced from the manifold hole 22 of each cell into the blood chamber 28 formed between paired membranes through the tunnel-like channel 24 formed by paired members 29, 29', and, after exchanging substance with the dialysate is introduced into the dialysate chambers 27, 27' formed between the membrane support sheets, toward the manifold hole 23 through the tunnel-like channel of the blood distributing member 25 formed by a pair of members with grooves 30, 30'.

Thus, in said hemodialyzer, blood exerts a uniform pressure upon the membrane while the blood passes through the blood path formed between paired membranes composing the blood flow cell and the dialysate passes through the dialysate path formed between the membrane support sheets of the dialysate cell adjacent to the blood flow cell and the membrane. This pressure is also exerted uniformly upon a large number of projections formed on the central portion of the membrane support sheet of the dialysate cell through the membrane, resulting in the formation of a winding blood path between the membranes and gently turbulent flow of fluid. Dialysate flowing through the fluid path formed between the membrane and the adjacent membrane support sheet is properly distributed in each layered space.

Figure 5:
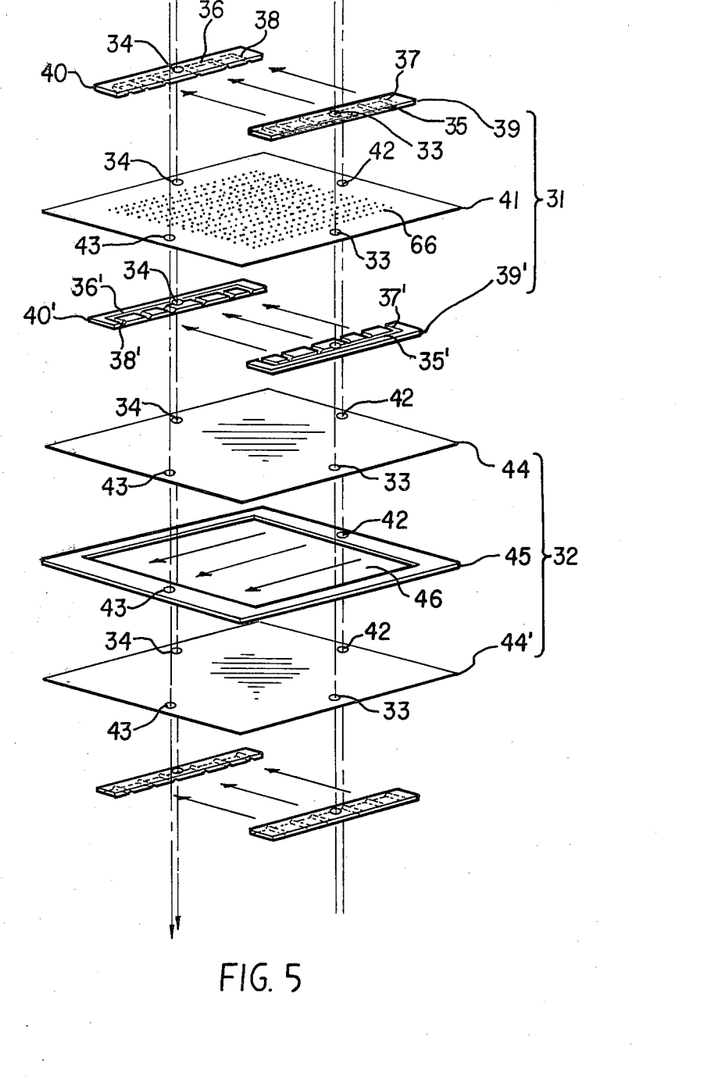
FIG. 5 is an exploded view showing a fundamental arrangement of composing members in another stack assembly by way of illustration of blood flow cells and dialysate cells.

Referring to FIG. 5, another example of a stack structure is shown in which the structure of the distributing members for dialysate and blood is just contrary to that shown in FIG. 2. That is, a dialysate cell 31 comprises: the dialysate distributing member for introducing and discharging dialysate provided with pairs of membranes 39, 39' and 40, 40' having the dialysate distributing grooves 35, 35' and 36, 36', respectively, connected to the manifold holes 33 or 34 communicating with the inlet or outlet port for dialysate and a plurality of grooves 37, 37' and 38, 38' connected to the abovesaid grooves; and the membrane support sheet 41 having a large number of projections at the central portion thereof, and, at the peripheral portion, manifold holes 42, 43 communicating with the inlet and outlet port of blood and the manifold holes 33, 34 communicating with the inlet and outlet ports of dialysate. Said members 39, 39' and 40, 40' are identical with each other in every respect, the grooved surfaces thereof being disposed so as to interpose the membrane support sheet. Therefore, when the stack assembly is compressed, tunnel-like channels are formed.

Meanwhile, the blood flow cell 32 comprises: a pair of membranes 44, 44' having, at the peripheral portion thereof, the manifold holes 42, 43 communicating with the inlet and outlet ports for blood and the similar holes 33, 34 communicating with the inlet and outlet for dialysate; and the blood frame 45 disposed between a pair of membranes and having a wide opening 46 at the central portion thereof, the manifold holes 42, 43 communicating with the inlet and outlet ports for blood at the peripheral portion, and the fluid path connecting the manifold holes with a wide opening.

The dialysate distributing member is fitted in a wide opening of the blood frame. Therefore, when the stack assembly is compressed, the dialysate distributing members are stacked fluid-tightly through the membrane, where permeation of the dialysis into the blood due to leakage can be prevented.

Figure 6:
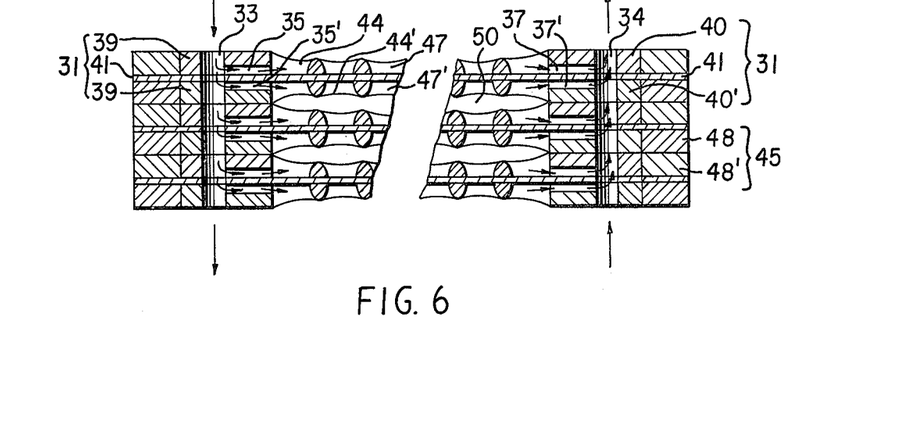
FIG. 6 is a detailed view for clearly showing the dialysate path.
Figure 7:
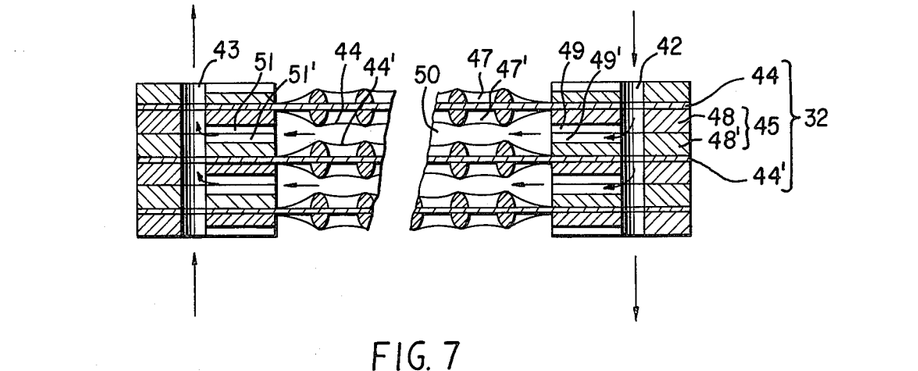
FIG. 7 being the same for the blood path, shown in FIG. 5.

For clearer understanding of the fluid path of dialysate and blood, FIGS. 6 and 7 are referred to. FIG. 6 is a sectional view of the dialysate path. The dialysate cells, each being composed of pairs of membranes 39, 39' and 40, 40' and the membrane support sheet 41 disposed between said members and having a large member of projections 66 at the central portion thereof, are fitted in the blood frame 45 disposed between paired membranes 44, 44' and stacked, interposing the membrane. Dialysate is introduced from the dialysate manifold hole 33 of each cell to two tunnel-like channels formed by the grooves 35, 35' on a pair of members 39, 39' and the support plate 40, then to the dialysate chamber 47, 47' formed between adjacent membrane and membrane support sheet, and, after exchanging substances with the blood introduced into the blood chamber 50 formed between paired membranes, to the dialysate manifold hole 34 through the tunnel-like channels formed by the grooves 37, 37' on paired membranes 40, 40' and membrane support sheet 41. FIG. 7 is a sectional view of the blood path, wherein an example of a blood path in the shape of a tunnel formed by a pair of frames similar to that shown in FIG. 4, the blood flow cell 32 being composed of a pair of frames 48, 48' having introducing grooves 49, 49' and discharging grooves 51, 51' and membranes 44, 44' disposed on either side of a pair of frames is shown. Blood is introduced from the blood manifold hole 42 to the chamber 50 through the tunnel-like channel formed by the grooves 49, 49' on a pair of frames, and, after exchanging substances with the dialysate introduced into the dialysate chamber formed between the membrane and the membrane support sheet, to the manifold hole 43 through the tunnel-like channels formed by the grooves 51, 51' on paired frames.

Figure 8:
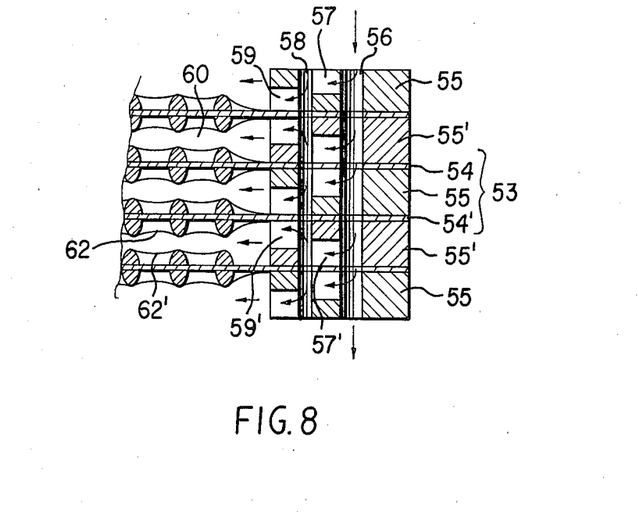
FIGS. 8 and 9 are views of the other constructions of the blood path.
Figure 9:
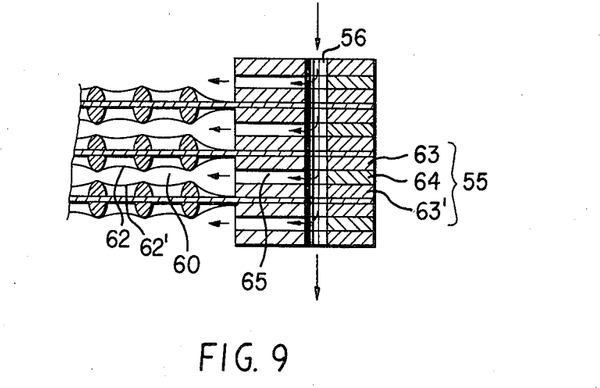

FIGS. 8 and 9 are sectional views showing examples of other structures of the distributing members for blood comprising the blood flow cell 53. FIG. 8 is a view showing an example using two kinds of distribution members 55, 55' composed of a sheet member. The distributing members 55 and 55' are symmetrical with each other in configuration. The distributing member 55 is connected with the blood manifold 56, groove 57 connected to said manifold, and blood chamber 60, and, on another side of said groove 57, a groove 59 is provided and connected to said groove 57 through the opening 58. The distributing member 55 must be so disposed as to lie always between two distributing members 55'. Adjacent two distributing members 55' interposing the distributing member 55 and the membrane support sheets 61, 62 are provided the grooves 57' and 59' symmetrically with those 57 and 59 respectively formed on said distributing member 55. Therefore, when the blood flow cells are stacked, each of surfaces on the sides where the grooves 57,57' and 59, 59' of the blood distributing members 55 and 55' respectively is sealed by compression through the interposed membrane. In this way, blood is prevented from leakage. Blood is introduced from the manifold hole 56 to the blood chamber 60 formed by a pair of membranes, passes through the tunnel-like channel formed by the grooves 57, 57', the membrane, and the membrane support sheet, from there passing through the opening 57, changing the course of flow, and passing through the tunnel-like channel. The depth of said groove should be a half or more of the thickness of the member in order to prevent staying of bubbles contained in the blood. The inlet and outlet ports for blood are identical with each other in the configuration. FIG. 9 is a view of an example of the blood distributing member 55 composed of three pieces of elemental members. The distributing member 55 comprises a pair of members 63, 63', in each of which the blood manifold hole 56 only is provided, and the member 64 arranged between said pair of members and provided with distributing opening 65 connected with the blood manifold hole 56 and the manifold. Said opening 65 is formed by and between a pair of members 63, 63' in the form of a tunnel. Blood is introduced from the manifold hole 56 to the blood chamber 60 formed by paired membranes through said tunnel-like channel. The blood introducing and discharging portions are identical with each other in structure.

Figure 10:
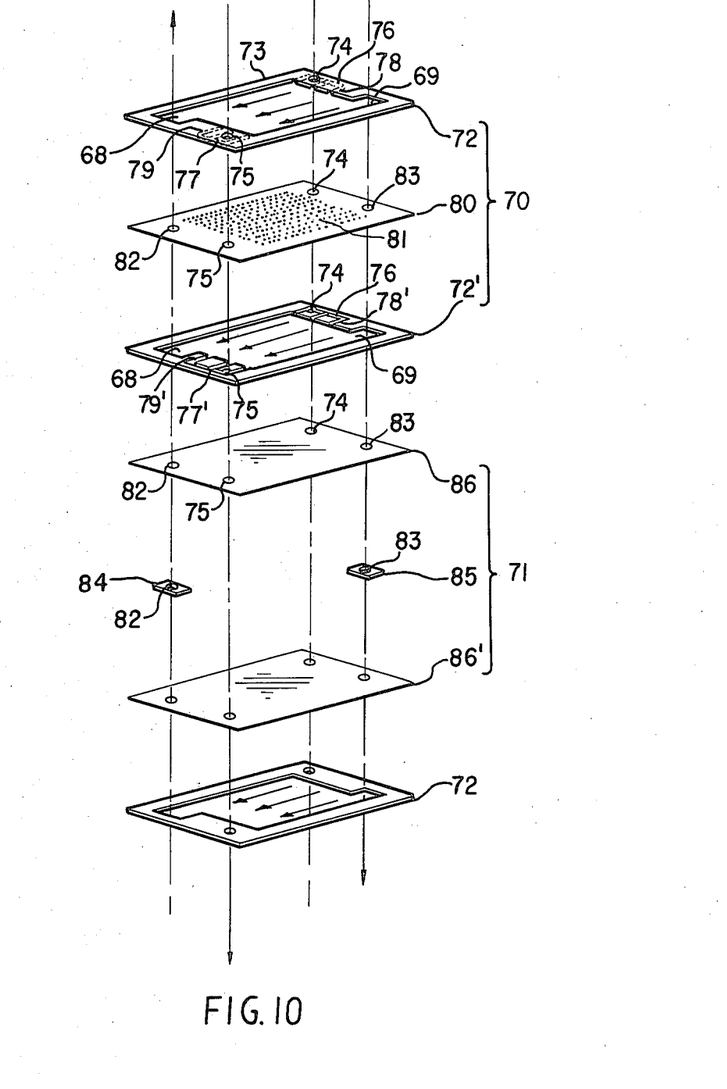
FIG. 10 is an exploded view showing a fundamental arrangement of composing members in a further stack assembly by way of illustration of blood flow cells and dialysate cells.

The abovesaid hemodialyzers are all of such type that the blood flow and the dialysate flow are crossing in direction and, now, an example of another type of construction in which both fluids flow in inverse directions, with each other is shown in FIG. 10. The stack assembly of dialysate cells and blood flow cells shown in FIG. 10 is identical with that shown in FIG. 2 in fundamental construction. The dialysate cell is composed of: a pair of dialysate frames 72, 72' provided with a wide opening 73 at the central portion thereof, the manifold holes 74, 75 at the peripheral portion which communicates with the inlet and outlet ports for dialysate, the distributing grooves 76, 77 connected to said manifold holes and a plurality of grooves 78, 79 for connecting said grooves 76, 77 with a wide opening 73, and openings 68, 69 located symmetrically opposite to the inlet and outlet ports for the dialysate at the peripheral portion so as to communicate with the wide opening 73 and to receive the blood distributing members 84 85; and the membrane support sheet having a large number of projections at the central portion thereof and the manifold holes 82, 83 communicating with the blood inlet and outlet ports and the manifold holes 74, 75 communicating with the dialysate inlet and outlet ports at the peripheral portion. Said dialysate frames 72, 72' are disposed so that the membrane support sheet 80 is interposed between the grooved surface thereof. Therefore, when the stack assembly is compressed, each of the grooves of the dialysate frames 72, 72' forms an independent tunnel-like channel between itself and the membrane support sheet 80.

On the other hand, the blood flow cell 71 is composed of a pair of members, 86, 86' provided with the manifold holes 82, 83 and 74, 75 at the peripheral portion thereof, the former two communicating with the blood inlet and outlet ports and the latter two with the dialysate inlet and outlet ports; the blood distributing member 84 for introducing the blood provided with a fluid path for introducing the blood into the blood chamber formed by paired membranes and communicating with the blood inlet and outlet ports disposed between paired membranes; and the blood distributing member 85 for discharging the blood provided with the fluid path for introducing the blood from the blood chamber. Abovesaid blood distributing members 84 and 85 are of the same structure and fitted in the openings 68 and 69 of the dialysate frame. Therefore, when the stack assembly is compressed, the blood distributing members are stacked fluid-tightly, enabling prevention of leakage of blood and of dialysate into blood.

It will be understood that, in the case where the flowing direction of blood is against that of dialysate, the structure of the frame, differing from that shown in FIG. 10, in which an opening is provided at the central portion of the blood distribution member may be available. It goes without saying that employment of any of structures for the blood distribution member as shown in FIGS. 7 and 8 is optional.

The membrane support sheet used for the dialysate cell is composed of a projection support layer and a large number of projections formed on either side of said support layer. The height of each projection on the membrane support sheet and other dimensions are required to be extremely uniform and exact for holding the membrane under uniform condition, preventing rupture of the membrane, and ensuring an appropriate fluidity for the transfer of substances between the blood and the dialysate. On the other hand, a thinner membrane support sheet is desired for miniaturization of the hemodialyzer. The thickness of the projection support layer of the membrane support sheet ranges from 5 to 500μ is desired to be with 5-200μ for further miniaturization of the dialyzer. Projections are provided in uniform distribution density in the central portion of the membrane support sheet and in the height of 50-500μ, occupying 5-50% of the total area of the membrane support zone and numbering 15-500 per 1 cm². For preventing clogging in the fluid path due to a swollen membrane distending downward toward the projection support layer, a space 'd' between projections is preferrably determined according to the following formula:

$$d < \frac{1.6 h}{\sqrt{a}}$$

where,
a = rate of swell of membrane,
h = height of a projection

This space also applies to the distance between the extreme end of the outlet of the tunnel-like channel connecting the manifold holes for dialysate with the dialysate chamber and the projection at the membrane support zone. Any of the known shapes of projection is available, however, the shape is preferrably conical for ensuring the most appropriate fluidity of blood and dialysate. In the latter case, conical projections disposed in a diagonal grate arrangement with the height of 100-300μ are often used, whereby they number 25-250 per 1 cm² in the membrane support zone.

Such a membrane support sheet as above can be manufactured with compression molding or embossing in a customary known molding method for thermoplastic resin film such as polyethylene, polypropylene, polycarbonate, or polyester. Also, such a method as described in U.S. Pat. No. 3,753,712 may be applicable in which a photoinsolubilizable plastic material overlaid with a master transparency prepared photographically in the usual case and having transparent and opaque portions arranged in a fixed pattern, is then exposed to radiation which penetrates through the master transparency, in order to insolubilize a part of plastic material adjacent to the transparent portion but not to the opaque portion and to dissolve a solubilizable part of the plastic material.

For a midget portable hemodialyzer, a membrane support sheet with the support zone formed by projections of 5–50μ high is recommended. Such a thin membrane support sheet made of plastic is prone to deform, followed by difficulty in stacking. Thus, in the case of an extremely thin sheet, a metallic sheet stable in rigidity and corrosion-proof such as one made of stainless or titan steel is preferrable for the use as a fluid distributing member. The fluid distributing metallic member as above is easily molded by an etching process.

The fluid distributing members used for the dialysate cell and the blood flow cell should be not only provided with an elaborately designed fluid path interconnecting the fluid manifold with the fluid chamber but should also be so flat as to be sealingly in tight contact with each other when all cells are compressed after being stacked. These members can be prepared by injection or press molding of plastic material. The membrane support sheet, too, can be made of said metal by etching, and, in this case, if the fluid distributing metallic member is used, it can be connected with said member by an appropriate adhesive.

A pair of membranes are used for the blood flow cell, where each membrane is made of regenerated cellulose, polyvinylalcoholic, polycarbonate, or polyacrylonitrile resin hitherto used as dialysis membrane. Among these membranes, any one suitable to the respective purpose must be used, of course, for example, polyvinylalcoholic, polyethylene, or acetylcellulosic filtration membranes are available for blood filtration. For some specific purposes, a metallic filter of stainless or titan steel with minute holes may be used.

When fabricating these cells, a stack assembly comprising said cells is compressed and retained by the top and bottom manifold plates, and piece-by-piece or single operation welding of the cells, adhesion by the application of resin, or embedding of cells into the plastic material comprising the housing is applicable. In any case, the assembly must be kept strictly free from outward and inward leakage of fluid.

The number and dimension of the cell to be used depends on the patient's body size and age as well as the condition whether the apparatus is used as hemodialyzer of hemo-filter, at home or in the hospital, or is carried by the patient. When the apparatus illustrated in FIG. 2 is used as a dialyzer in the hospital, a dialysate cell is composed of, for example: a pair of dialysate frames of stainless steel sheet worked with etching, each having such dimensions as 200μ thick, 30×6 cm long along the outer sides and provided with a wide opening at the central portion of 24×4 cm long along the sides and a plurality of grooves of 1 mm wide and 150μ deep communicating with the dialysate manifold; and the membrane support sheet having a support area defined by the lengths of 24×3.8 cm and 49 pieces per 1 cm² of 200μ high conical projections on either side of the projection support layer of 95μ thick formed from 100μ thick polyethylene film by compression molding. A blood flow cell, on the other hand, is composed of a pair of 15μ thick (at wet condition) regenerated cellulose membranes and a pair of blood distributing members, which are to be fitted into the dialysate frame, made of stainless steel sheet worked with etching, each having such dimensions as 200μ thick, 3.9×1.9 cm long along the outer sides and provided with a plurality of 1 mm wide and 150μ deep grooves for connecting the manifold with the blood chamber. Each of blood flow cells is fitted into each of the spaces formed between every adjacent two of 104 pieces of said stacked dialysate cells and, thus, with the application of compression, using the top and bottom manifold pressing plates of polycarbonate to retain the apparatus, a hemodialyzer having external dimensions as 30×6×3.6 cm and membrane surface area of 1 cm² is obtained. This surface area of the membrane is sufficiently effective for application to an adult. Said hemodialyzer is smaller in size than that using a conventional membrane support plate.

When the apparatus is used as a portable dialyzer, the dialysate cell is composed of, for example: a pair of dialysate frames of stainless steel sheet worked with etching, each having dimensions, for example, 100μ thick and 9.5×6 cm long along the outer sides and provided with a wide opening at the central portion having dimensions such as 6×4 cm long along the sides, and a plurality of grooves of 1 mm wide and 50μ deep for connecting said opening with the dialysate manifold; and the membrane support sheet having the support area defined in dimensions such as 6×4 cm and 89 pieces per 1 cm² of 100μ high conical projections on either side of the projection support layer of 25μ thick formed from 30μ thick polyethylene film by compression molding. The blood flow cell is composed of a pair of 15μ thick (at wet condition) regenerated cellulose membranes, each being 9.5×6 cm long along the outer sides, and a pair of blood distributing members made of stainless steel sheet worked with etching, each being 100μ thick and provided with a plurality of 1 mm wide and 50μ deep grooves connecting the blood manifold with the blood chamber.

Each of blood flow cells is fitted into each of the spaces formed between every adjacent two of 104 pieces of said stacked dialysate cells and, thus, with the application of compression for the retention of the apparatus, using the top and bottom manifold pressing plates of 1 mm thick titan steel sheet, a small-sized hemodialyzer having external dimensions as 9.5×6×1.4 cm and membrane surface area of 0.5 cm² is obtained.

Figure 11:
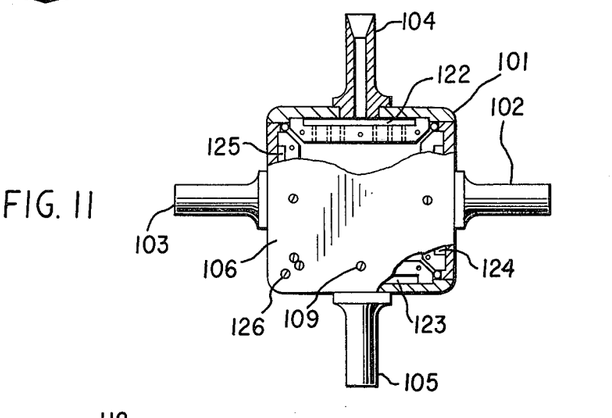
FIG. 11 is a perspective view of a midget hemodialyzer assembly.
Figure 12:
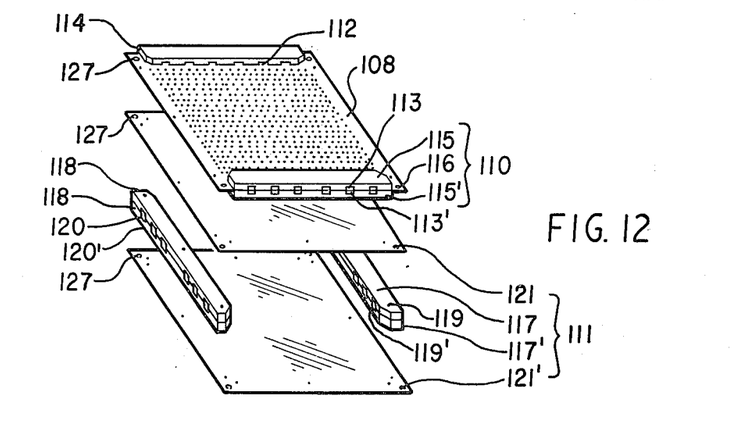
FIG. 12 is an exploded view showing a fundamental arrangement of composing members in the hemodialyzer shown in FIG. 11 by way of illustration of blood flow cells and dialysate cells.

A further small-sized hemodialyzer is fabricated of such structure that the distributing members are devoid of manifold holes communicating with the inlet and outlet ports for both blood and dialysate, as shown in FIGS. 11 and 12. FIG. 11 is a view of an assembled hemodialyzer, wherein the hemodialyzer 101 comprises a plurality of dialysate cells and of blood flow cells, a case having blood inlet port 102 and outlet port 103 as well as dialysate inlet port 104 and outlet port 105, and two sheets of pressing plates. These pressing plates 106, 107 are disposed respectively at both ends of the case which contains the dialysate cells and blood flow cells, where contained members are in stack relation by means of pins 109 passing through the holes drilled at 12 points on the peripheral portion of each pressing plate. The blood flow cells composing the assembly must be disposed so as to be laid within two dialysate cells in any case.

FIG. 12 is an exploded view showing the order of arrangement in which the dialysate cell 110 and blood flow cell 111 are stacked, wherein the dialysate cell 110 is composed of pairs of dialysate distributing members 114, 114' and 115, 115' for introducing dialysate, each being provided with the dialysate distributing grooves 112, 112' and 113, 113' respectively, and the membrane support sheet 116 is provided with the distributing member for discharging the dialysate and a large number of projections at the central portion thereof. Said members 114, 114' and 115, 115' are the same in configuration, and the grooved surface thereof are disposed face-to-face so as to interpose the membrane support sheet. Therefore, when the assembly is compressed, the grooves on one of said members form independent tunnel-like fluid channels in association with respective groove on the other member.

The blood flow cell 111 is composed of a pair of membranes 121, 121' and pairs of members 117, 117' and 118, 118' disposed between said pair of membranes and are identical with said dialysate distributing members in configuration. Said members are so arranged that in the surfaces thereof having grooves 119, 119' as well as 120, 120' are in face-to-face relation.

When a stack assembly composed of said blood flow cells and dialysate cells is placed in a case, dialysate chambers 122, 123 communicating with the dialysate inlet and outlet ports and blood chambers 124, 125 are formed between the stack assembly and the case. Said grooves of each member communicate with each chamber through the tunnel-like chambers. When the blood flow cells and dialysate cells are stacked, pouring of non-hardened resin such as polyurethane through the resin-application hole 126 of the pressing plate is required for sealingd four corners of the stack of cells to prevent leakage of blood and/or dialysate. The holes at the four corners of the membrane support sheet 116 and each of paired membranes 121, 121' are those which are provided for pouring of resin.

The distributing members composing the dialysate cell and blood flow cell of said hemodialyzer are made of $100\mu$ thick stainless steel sheet worked with etching to provide a plurality of 1 mm wide and $50\mu$ deep grooves. The membrane support sheet has a membrane support area in the shape of a right square of 2.5 cm side length and provided with 89 pieces per 1 $cm^2$ of $100\mu$ high projections on either side of $25\mu$ thick projection support layer formed from $30\mu$ thick polyethylene film by emboss molding.

A hemodialyzer accomodated with the cells as above has a membrane surface area of 0.125 $m^2$ and is $4 \times 4 \times 2$ cm in size which enables the use of the apparatus while being carried.

For confirming the bubble-removal effect of the hemodialyzer according to this invention, tests were made with respect to two kinds of structures as shown in FIGS. 2 and 12, in which water was flowed at the rate of 0.8 ml/min through the structure such that each of the blood flow cells was interposed between every two adjacent dialysate cells and the stack thereof was held by transparent polymethylmetacrylate plate, and the staying of bubbles was not found in either of the structures. In contrast with this, when an experiment was conducted using the support plates of 1 mm thick made of polypropylene by compression molding according to the disclosure by U.S. Pat. No. 3,841,491, bubbles were found staying at the slit-shaped portion. These bubbles did not move out even when the assembly was tapped or inverted. Further, a similar experiment, in which $300\mu$ mesh was used instead of the membrane support zone in a conventional structure but cut away at this time, showed that bubbles stayed throughout the mesh and did not move even when the assembly was inverted.

Thus, there has been confirmed less staying of bubbles in the hemodialyzer according to this invention irrespective of small size thereof.

In addition to abovesaid advantage, the small size of this hemodialyzer enables dialysis not requiring the special use of a blood pump since the circulation of blood in the dialyzer is sufficiently performed only by the patient's heart. This indicates that the apparatus is operable even at home and suitable to the use as daily wear.

Although the description has hitherto been made about the dialyzer for hemodialysis, this invention is not limited to this field alone. In fact, this invention is readily applicable to such cases as those requiring dialysis of two kinds of fluids different in nature from each other, transfer of substance from the first fluid to the second one through the semipermeable membrane, or filtration of substance in the first fluid through the permeable membrane. In such cases, efficiency of transfer of substance is increased thanks to a large surface area of the membrane contained in the small volume of the apparatus.

This invention has been described heretofore with respect to specific embodiments thereof, however, it will be apparent to the skilled in the art that there may be a variety of modifications and configuration changes, and, therefore, this invention includes all of such modifications and configuration changes.

What is claimed as new and desired to be secured by Letters Patent of the United States is:

1. A fluid treatment apparatus comprising: a stack assembly composed of two kinds of cells disposed in such order of arrangement that the adjacent cells are different in kind from each other; a first cell positioned in a cell plane and including a first fluid distribution means having inlet and outlet ports for a first fluid and the membranes lying on either side of said means; a second cell positioned in said cell plane and including a second fluid distribution member having inlet and outlet ports for a second fluid and comprising paired members having a plurality of grooves on one surface thereof that form independent tunnel-like fluid paths between the membrane support sheet and a respective one of the paired members, said membrane support sheet being 5-500$\mu$ thick and provided with a large number of projections on either side of the central portion thereof, said projections being 50-500$\mu$ thick, and said pair of grooved members being arranged so that the grooved surfaces are face-to-face with each other, interposing said membrane support sheet therebetween; and, so that each of said distribution members may introduce a respective fluid separately through said stack assembly and so that said first fluid may be distributed between a pair of membranes composing the first cell as well as the second fluid between the second cell and an adjacent membrane, the fluid manifolds of all of said cells are adapted to communicate with said inlet and outlet ports for said first and second fluids and are arranged so as to perform substantially uniform diffusion exchange of substances between said first and second fluids; wherein said first and second fluid distribution members do not overlap one another in said cell plane.

2. A hemodialyzer as defined in claim 1 wherein the first fluid and the second fluid are blood and dialysate respectively.

3. A fluid filtration apparatus comprising: a stack assembly composed of two kinds of cells disposed in such order of arrangement that the adjacent cells are different in kind from each other; a first cell positioned in a cell plane and having an inlet port and an outlet port and including a distribution means for the first fluid fed into the stack assembly, and membranes lying on either side of said means; a second cell positioned in a cell plane and having an inlet port and an outlet port and including a second fluid distribution means composed of paired means having a plurality of grooves on one surface thereof that form independent tunnel-like fluid paths between the membrane support sheet and a respective one of said paired members, said membrane support sheet being 5–500μ thick and provided with a large number of projections on either side of the central portion thereof, said projections being 50–500μ thick, and said pair of grooved members being arranged so that the grooved surfaces are face-to-face with each other, interposing said membrane support sheet therebetween; and, so that said fed fluid may be distributed into a space between a pair of membranes comprising the first cell and so that said filtration fluid may be collected from a space between the second cell and adjacent membrane, fluid manifolds of all of said cells are adapted to communicate with said inlet port for fed fluid and said outlet port for filtration fluid, whereby the gentle and uniformly turbulent flow of fed fluid being generated in uniform thickness in said first cell by the force due to the pressure of fed fluid results in uniform filtration of said fed fluid, wherein said first and second fluid distribution members do not overlap one another in said cell plane.

4. A hemo-filtration apparatus as defined in claim 3 wherein the first fluid fed into the stack assembly is blood.

5. A fluid treatment apparatus as defined in claim 1 or 3 wherein the stack assembly is surrounded by two end-fastening plates, each being communicated with all of said inlet ports and outlet ports.

6. A fluid treatment apparatus as defined in claim 1 or 3 wherein the first fluid distribution means comprises distribution members, on each of which a groove communicating with said fluid manifold and another groove communicating with a space between a pair of membranes are connected, said grooves disposed symmetrically with an adjacent distributing member.

7. A fluid treatment apparatus as defined in claim 1 or 3 wherein the first fluid distribution means is disposed so that a tunnel-like channel is formed by a pair of members having a plurality of grooves and arranged in such manner that the grooves thereof are in face-to-face relation.

8. A fluid treatment apparatus as defined in claim 1 or 3 wherein each said first cell has a wide opening at the central portion thereof, manifold holes communicating with at least one of the inlet and outlet ports for the first fluid, and fluid paths for connecting said manifold holes with the wide opening; and the distribution members comprising the membranes lying on either side of said first fluid distribution member and composing the first and second cells are fitted into said wide opening.

9. A fluid treatment apparatus as defined in claim 1 or 3 wherein the second cell has a wide opening at the central portion thereof, manifold holes communicating with at least one of the inlet and outlet ports, on the peripheral portion thereof; wherein a pair of members provided with grooves for connecting said manifold hole with the wide opening are arranged so as to interpose the membrane support sheet having a large number of projections at the central portion thereof and at least one of the first fluid inlet and outlet port, and at least one of the second fluid inlet and outlet port, in such manner that the grooved surfaces of said members are in face-to-face relation; and wherein the first fluid distribution members composing the first cell are fitted into said wide opening.

10. A fluid treatment apparatus as defined in claim 1 or 3 wherein the projections in large number of pieces are in the shape of cones.

11. A fluid treatment apparatus as defined in claim 1 or 3 wherein the projections are formed at the rate of number of pieces as 15–500 per 1 $cm^2$.

12. A fluid treatment apparatus as defined in claim 1 or 3 wherein the membrane support sheet is obtained through emboss or compression molding applied to thermoplastic.

13. A fluid treatment apparatus as defined in claim 1 or 3 wherein the membrane support sheet is obtained through etching applied to corrosion-proof metalsheet.

14. A fluid treatment apparatus as defined in claim 13 wherein corrosion-proof metal is stainless steel or titan steel.

15. A fluid treatment apparatus as defined in claim 1 or 3 wherein the first and second fluid distribution members are obtained through compression molding applied to thermoplastic.

16. A fluid treatment apparatus as defined in claim 1 or 3 wherein the elemental members composing the first and second fluid distribution members are obtained through etching applied onto corrosion-proof metal.

17. A fluid treatment apparatus as defined in claim 16 wherein corrosion-proof metal is stainless steel or titan steel.

18. The fluid treatment apparatus of claim 1 or 3 wherein said first fluid distribution means is positioned so as to provide fluid flow perpendicular to that of said second fluid distribution means.

* * * * *